Nov. 4, 1969     L. C. HARDISON     3,476,176
METHOD AND APPARATUS FOR ALTERNATELY HEATING AND COOLING
BY INDIRECT HEAT TRANSFER
Filed Feb. 8, 1968
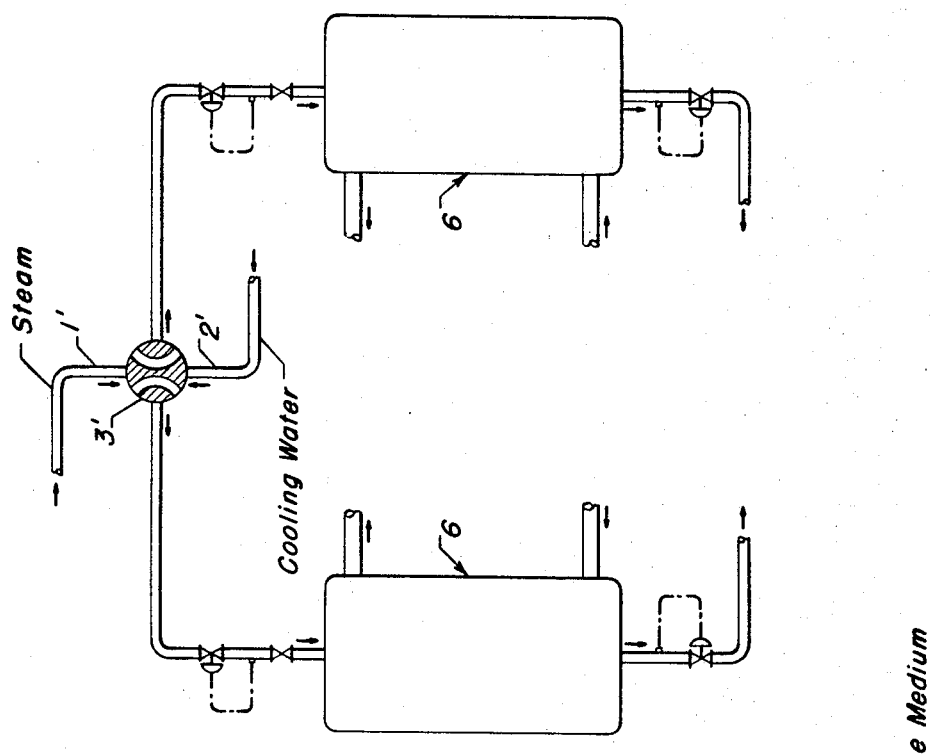
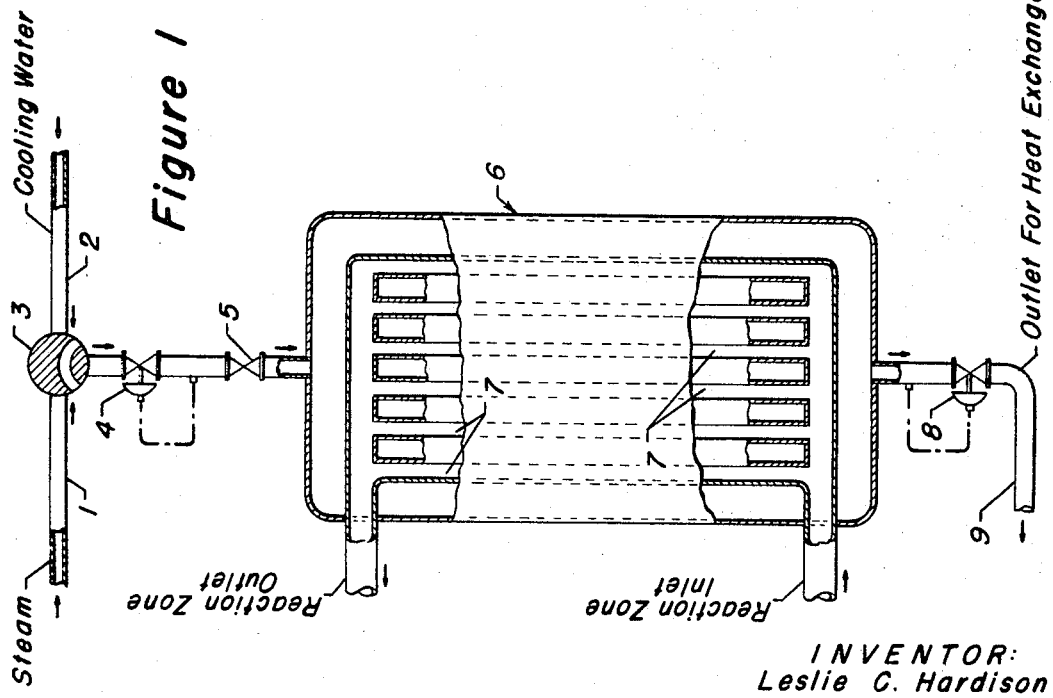
INVENTOR:
Leslie C. Hardison
BY
*James R. Hoatson, Jr.*
*Philip T. Liggett*
ATTORNEYS United States Patent Office 3,476,176
Patented Nov. 4, 1969

3,476,176
METHOD AND APPARATUS FOR ALTERNATELY HEATING AND COOLING BY INDIRECT HEAT TRANSFER
Leslie C. Hardison, Norwalk, Conn., assignor to Universal Oil Products Company, Des Plaines, Ill., a corporation of Delaware
Filed Feb. 8, 1968, Ser. No. 704,036
Int. Cl. F25b *13/00, 29/00;* F28f *19/00*
U.S. Cl. 165—2   5 Claims

ABSTRACT OF THE DISCLOSURE

An indirect heat exchange system providing the alternate heating and cooling of enclosed reaction zones by the cooling and condensation of steam alternating with the absorption of heat by cooling water, and more particularly there is the introduction of steam and the cooling water from an elevated pressure through an adjustable valve means into a container encompassing said reaction zones, and the maintenance of a lower elevated back pressure in said container by the regulation of the rate of water withdrawal from said container, utilizing a back pressure regulating means.

---

The present invention relates to an improved method and apparatus for alternately heating and cooling enclosed reaction zones in an indirect heat exhange system. Heating and cooling cycles are effected by passing steam and water respectively from a substantially constant elevated pressure to a container, said container encompassing said reaction zones, and in all cycles maintained at a lower substantially constant elevated pressure by regulation of the rate of withdrawal of water from said container.

Existing heat exchange units, which heat the contents of enclosed reaction zones by circulating a heat transfer fluid in a container encompasing said reaction zones, operate on several principles. One class of such units effects heating by the introduction of a hot fluid heat exchanging medium into said container, whereby the fluid heats the contents of said reaction zones without undergoing a change of state from gas to liquid. This type of operation has an advantage in that the heat exchanging medium can be readily maintained at constant pressure throughout the heating cycle, but carries with it the disadvantage of not utilizing the heating capacities available from the heat of condensation which a vaporized heat exchanging medium would release were it to condense from a gas to a liquid.

Another class of units effects heat transfer by cooling a heat exchanging vapor in a gaseous state, liquefying it, and then cooling the liquid. Operation in this manner utilizes a great deal of available heat in that the heat exchanging medium gives up heat in cooling in its gaseous state, heat of condensation, and heat in cooling in its liquid state. The disadvantage lies, however, in that the condensation of the heat exchanging medium causes a great fluctuation of pressure within a heating jacket, or container. This wide variation of pressure subjects both the outer walls of the container and the walls of the enclosed reaction zones to large material stresses which are not encountered in units undergoing little or no pressure variation. Also, the extreme pressure variation during the heating of the enclosed reaction zones has a further disadvantage in that it necessitates extreme peaks in heating fluid consumption. This uneven fluid flow means that either a power plant of large capabilities must be constructed to meet peak demands for heat exchanging vapor, or a reservoir must be constructed to store this heat exchanging vapor. Neither of these alternatives solves the aforementioned problem of material stresses where operating pressures vary widely.

With respect to the heating cycle of a heat exchanging unit, the present invention eliminates the disadvantages of the aforementioned classes of heat exchanging units. In utilizing the large quantity of available heat by both cooling and condensing the heat exchanging medium, constant pressure is maintained in the container within which the heating medium circulates. This novel feature of heating by condensation at a constant pressure must be accomplished using inlet and outlet means compatible for use with a fluid cooling medium, in a system in which alternate heating and cooling cycles are effected. Compatibility is insured through the use of steam as a heating medium, which condenses to water in the container, or jacket, surrounding the enclosed zones to be heated and cooled. When cold water is the cooling medium which is circulated within said container during the cooling cycle, water is the only substance which is withdrawn during either the heating or cooling cycle. By regulating the rate of withdrawal of water, the pressure within the container, or jacket, can be very accurately controlled with minimal reaction time between a pressure fluctuation and adjustment of the withdrawal rate of water.

The primary purpose of the present invention is to maintain a uniform flow of steam or cooling water to a heat exchanging unit undergoing alternating heating and cooling cycles. As with other heat exchanging units which undergo alternate heating and cooling cycles, the present invention is particularly adaptable to "switch-bed" operations, that is, operations of at least two heat exchanging units which co-act so that while at least one unit is undergoing a heating cycle, at least one other unit is undergoing a cooling cycle. When used in this manner, my invention effects not only substantially constant steam consumption during the heating cycle of one unit, but effects substantially constant steam consumption throughout the operation of the entire system. This greatly reduces the steam producing or storing requirements necessary to operate such a system.

A second purpose of my invention is to reduce material stresses in the component parts of a heat exchange unit which effects alternating heating and cooling cycles. Since two conditions which affect material stresses are changes in temperature and changes in pressure, the present invention greatly reduces such stresses my maintaining constant pressure in any given element of the system.

A third purpose of the present invention is to effect as uniform a rate of heating as possible from the heat exchanging medium. In a unit where steam is initially throttled from a very high pressure to a very low pressure into a container for the circulation of the heat transfer medium, the rate of heat exchange during the early part of the heating cycle is very great, as compared to the heat exchange rate during the latter part of the heating cycle. This peak heating early within the heating cycle is often undesirable. An illustration of the problems thus created is shown by the effects resulting where the cycles of the heat exchange unit are used to effect the adsorption and desorption of gases in enclosed reaction zones. The heating cycle effects desorption of the gases in relation to the heat applied to the adsorbent. Where there are large variations in the heat applied, as previously described, the volume of gas released from the adsorbent varies accordingly, thus preventing a uniform processing of gases so released. One industrial process where this is particularly important is in the production of nitric acid, where oxides of nitrogen in tail gas, or exhaust gas, are adsorbed by material contained in the enclosed reaction zones during the cooling cycle of the heat exchanger.

During the heating cycle, the adsorbed gases are desorbed and are washed with water out of the reaction zones as nitric acid. Extreme pressure variations within the heat exchanger cause wide fluctuations in the quantity and composition of the nitric acid produced from the adsorbents.

The method of the present invention is applicable to any heat exchanging unit which utilizes the circulation of a condensable heat exchanging medium in a container to alternately heat and cool an encompassed enclosed reaction zone by indirect heat transfer, that is, by the conductive passage of heat between the heat exhcanging medium and the contents of the enclosed reaction zones through walls separating the encompassing container from the enclosed reaction zones. Among the possible applications of the present invention are adsorption processes, regeneration of catalysts, tempering processes as applied to metals, plastics, and glass, as well as other industrial processes.

Whereas the present improved method of alternately heating and cooling reaction zones enclosed in an encompassing container is not limited to switch-bed operations, the advantages of the present invention are thereby maximized. The application of my improved apparatus to a switch-bed operation insures a substantially uniform steam consumption, cooling wàter consumption, and heat transfer rate during the heating and cooling cycles. This is accomplished by the use of at least two heat exchange units, each of which alternately undergoes heating and cooling cycles, and which together at all times during the operation of the system co-act to effect a heating cycle in at least one unit and a cooling cycle in at least one other unit. Where there are only two heat exchange units, one unit changes from heating to cooling cycle at the same time as the other unit changes from cooling to heating cycle. If more than two heat exchange units are used, the operation of the units is timed so that an entire heating-cooling cycle is completed by each unit in sequence at spaced time intervals. In this manner at least one unit is in a heating cycle and at least one unit is in a cooling cycle at all times during the operation of the system.

In a broad aspect my invention is, in a process for alternately heating and cooling, by indirect heat transfer, the contents of at least one enclosed reaction zone by the circulation of steam and water as heat transfer mediums in a container encompassing said reaction zones, the improvement which comprises effecting a heating cycle by throttling steam from a substantially constant elevated pressure source into the upper portion of said container, which is initially filled with water from a previous cooling cycle, and simultaneously maintaining within said container, a substantially constant elevated back pressure, lower than the pressure at said steam source, by withdrawing water from the lower portion of said container at a regulated rate, whereby said steam transfers heat to said reaction zones, and is thereby condensed, and is subsequently withdrawn as water, and alternating said heating cycle with a cooling cycle effected by introducing cooling water, from a source having substantially the same pressure as the aforesaid steam source, into the upper portion of said container, said container being maintained at substantially the same back pressure by the same means as in the heating cycle, whereby said cooling water cools the contents of said reaction zones and condenses the remaining steam in said container thereby filling said container with water.

In another aspect my invention is, in an indirect heat exchanging system comprising at least two units each of which undergoes alternating heating and cooling cycles, and which together at all times during the operation of the system, co-act to effect a heating cycle in at least one unit and a cooling cycle in at least one other unit, the improvement which in each unit comprises at least one enclosed reaction zone encompassed by a container of a heat transfer medium, a source of steam connecting through pressure regulating means and adjustable valve means to the upper portion of said container, a cooling source connected through pressure regulating means and adjustable valve means to the upper portion of said container, and a back pressure regulating means connected to outlet means from the lower portion of said container through which water is withdrawn from said container, whereby heat transfer fluid is introduced from a source at a substantially constant elevated pressure to a lower elevated back pressure which remains substantially constant by regulation of the rate of withdrawal of water.

In an indirect heat exchange system comprising two heat exchange units, each of which undergoes alternating heating and cooling cycles, and which together at all times during the operation of the system co-act to effect a heating cycle in one unit and a cooling cycle in the other unit, the present invention exhibits different characteristics at different times in the heating-cooling cycle. At the start of the heating cycle in one heat exchange unit, the unit is initially filled with cooling water, left from the last cooling cycle. Through a shut-off valve means, either manually or automatically operated, the source of cooling water is isolated from the heat exchange unit, and a steam source is opened to the heat exchange unit. The steam passes through the shut-off valve means and through a pressure regulating means, which increases or decreases steam flow in order to maintain a substantially constant elevated pressure at that point and down stream therefrom. A shut-off valve means is not required if the steam source is controlled by a pressure regulating means separate from that used for the cooling water source. If the same pressure regulating means is used to regulate both steam pressure and cooling water pressure during the respective cycles, however, at least one shut-off valve is required for the steam source and the cooling water source. When one shut-off valve is used, it is constructed to preclude both steam and cooling water from entering the system at the same time. In the heating cycle the steam passes the pressure regulating means, and enters an adjustable valve means, where it is throttled to the upper portion of a heat transfer medium container, wherein a lower substantially constant elevated back pressure is maintained. When a shut-off valve is not used, separate pressure regulating means and adjustable valve means must be used for the cooling water source and steam source. In this case, the adjustable valve means connecting the cooling water source to the container is closed, while the adjustable valve means connecting the steam source to the container is at least partially open. The back pressure maintained in the container is regulated by a back pressure regulating means which is connected through an outlet means to the lower portion of said container. Water is withdrawn therefrom at a rate determined in response to the pressure measurement at the back pressure regulating means. Initially steam entering the container condenses on a small amount of heat transfer surface. As the water level decreases, more surface is exposed to the steam, but the surface earliest exposed to the steam has been heated to a temperature nearly equal to that of the steam. Only the most recently exposed surface, therefore, is low enough in temperature to effectively condense steam. The net effect is a nearly constant rate of condensation as the water level decreases. Thus, as the condensation process proceeds, steam increasingly displaces water within the container, and at the end of the cycle, the container is substantially filled with steam.

In the transition from the heating cycle to the cooling cycle, the shut-off valve is operated to isolate the steam source from the system and to allow cooling water to enter the system. When a shut-off valve is not used, separate pressure regulating means and adjustable valve means must be used for the cooling water source and steam source. In this case, the adjustable valve means connecting the steam source to the container is closed, while the adjustable valve means connecting the cooling water source to the container is at least partially opened. Where a shut-off valve is used, the cooling water passes through the same pressure regulating means and the same adjustable valve means as are used to connect the steam to said container. In either case, the pressure regulating means maintains a substantially constant elevated pressure at and downstream from the point of measurement. The adjustable valve means passes the cooling water across a pressure drop to the container, where a back pressure regulating means maintains a lower substantially constant elevated back pressure in said container. As the cooling water enters the upper portion of the container and falls through the steam, it condenses the steam remaining in said container, thereby drawing in more water. This effect causes the container to shortly fill with cooling water, whereby a substantially constant rate of heat transfer is effected from the encompassed reaction zone to the cooling water. At the end of the cooling cycle, the cooling water is isolated from the container by the shut-off valve or adjustable valve means, and another heating cycle commences. The pressure regulating means, as well as the adjustable valve means and the back pressure regulating means are normally operated automatically, but may be operated manually. The length of time for each cycle may vary depending upon the application of this invention.

The various features of my invention are illustrated by the accompanying drawings in which:

FIGURE 1 shows in schematic cross section the operation of my invention in a single heat exchange unit;

FIGURE 2 shows in a schematic cross section the operation of my invention in two heat exchange units coacting together.

DESCRIPTION OF DRAWINGS

Referring now to FIGURE 1, a source of steam (not shown) and a source of cooling water (not shown) are connected to a two way shut-off valve 3 by way of inlets 1 and 2 respectively. Shut-off valve 3 is constructed to allow either the steam source or the cooling water source, but not both simultaneously to be connected to the upper portion of container 6 through pressure regulating valve means 4 and adjustable valve means 5. Container 6 is a pressure tight housing or jacket through which a heat transfer medium circulates, and which encompasses enclosed reaction zones 7, in a heat exchange unit which alternately heats, by the circulation of a fluid heat transfer medium in a container 6, and cools by indirect heat transfer, the contents of enclosed reaction zones 7. Pressure regulating means 4 maintains a substantially constant elevated pressure between pressure regulating means 4 and adjustable valve means 5. Adjustable valve means 5 throttles steam during the heating cycle, and passes cooling water from the substantially constant elevated pressure maintained by pressure regulating means 4 to the lower substantially constant elevated pressure maintained within container 6 by back pressure regulating means 8. Back pressure regulating means 8 maintains a substantially constant elevated pressure within container 6 by withdrawing water from the lower portion of container 6 at a regulated rate. Water leaves the heat exchange unit through outlet means 9.

During the heating cycle, steam passes through inlet 1, through the open shut-off valve 3, through pressure regulating means 4 and adjustable valve means 5, to the upper portion of container 6. There the steam heats the contents of enclosed reaction zones 7, and is condensed to water. At the start of the heating cycle, container 6 initially is filled with cooling water left from the previous cooling cycle. As the heating cycle progresses, water is drawn through outlet means 9 by back pressure regulating means 8. As the heating cycle progresses, the water initially within container 6 is withdrawn and replaced by steam, until at the end of the heating cycle, container 6 is almost completely filled with steam.

At the end of the heating cycle, shut-off valve 3 is operated, and the steam source is isolated from the heat exchange unit. The cooling cycle is then initiated when the shut-off valve 3 is turned open to passageway 2, where the cooling water is introduced. The cooling water flows through pressure regulating means 4 and adjustable valve means 5 into container 6, where the cooling water condenses any steam remaining in container 6. A substantially constant elevated back pressure is maintained in container 6 by the withdrawal of water from the lower portion of container 6 through outlet means 9 as regulated by back pressure regulating means 8. As the cooling cycle progresses, container 6 fills with water. At the end of the cooling cycle, shut off valve 3 is closed to inlet 2, and a new heating cycle is commenced by opening shut-off valve 3 to inlet 1.

Pressure regulating means 4 and back pressure regulating means 8 are both conventional, self-adjusting pressure regulating means. Adjustable valve means 5 is any conventional valve or orifice, the effective inside diameter of which can be varied by either automatic or manual means. Enclosed reaction zones 7 may or may not be connected together within or without container 6. Container 6, in any case, substantially encompasses enclosed reaction zones 7 and contains the heat transfer medium, by means of which heat passes indirectly, or by conduction, through the walls of enclosed reaction zones 7, either to or from the heat transfer medium in container 6. Shut-off valve 3 allows either steam or cooling water, but not both simultaneously, to pass to container 6. Shut-off valve 3 is unnecessary where separate pressure regulating means and separate adjustable valve means are used for the passage of steam from a steam source and a passage of water from a cooling water source. In this case, the two sources alternately are shut off by completely closing the respective adjustable valve means associated therewith.

FIGURE 2 is a further application and modification of my invention differing from the embodiment of FIGURE 1 in that FIGURE 2 schematically portrays an indirect heat exchanging system comprising two heat exchange units, each of which undergoes alternating heating and cooling cycles and which together at all times during the operation of this system, co-act to effect a heating cycle in one unit and a cooling cycle in the other unit. This co-action is effected through the use of a shut-off valve 3' which is constructed to allow steam to pass through inlet 1' into one heat exchange unit, while cooling water simultaneously passes from inlet 2' into the other heat exchange unit. Shut-off valve 3' is then adjusted to reverse the process, that is, cooling water then flows to the first heat exchange unit while steam passes to the other heat exchange unit. The shut-off valve 3', as portrayed, can be adjusted to preclude both steam and cooling water from passing to either heat exchange unit, though this feature is not essential to the operation of my invention.

The following example will further illustrate this invention.

Example I

In one manner of execution of my improved process for alternately heating and cooling using indirect heat transfer in a heat exchange unit, a heating cycle is effected by throttling steam from a substantially constant elevated pressure of about 180 p.s.i.g. into the upper portion of a container, said container encompassing a plurality of enclosed reaction zones, and said container being constructed for the circulation of a fluid heat transfer medium therein. The contents of said reaction zones are comprised of a material which selectively adsorbs the gaseous oxides of nitrogen contained in tail gas evolving from the production of nitric acid. Said container is maintained at a substantially constant elevated back pressure of about 150 p.s.i.g., but at least 100 p.s.i.a. This back pressure is maintained by withdrawing water from the lower portion of said container at a regulated rate. As the heating cycle progresses, said container gradually fills with steam and heat is transferred to the adsorbents contained in said enclosed reaction zones, thereby forcing off the adsorbed oxide of nitrogen to undergo further procesing. At the end of the heating cycle, the container is substantially filled with steam. The container is disconnected from the steam source and is connected to a source of cooling water. Cooling water, having substantially the same pressure as the aforesaid steam source, is passed into the upper portion of said container, which is maintained at substantially the same pressure by the same means as in the heating cycle. The cooling water cools the adsorbents contained in the enclosed reaction zones, thereby contributing to the increased adsorption of the oxides of nitrogen therein. The cooling water fills said container with water as the steam remaining from the heating cycle is condensed.

In all cases, the present diagrammatic drawings and the examples described herein shall not be considered limiting as to the temperatures and pressures at which this invention operates. Neither shall the types nor designs of indirect heat exchange units, containers, enclosed reaction zones, contents of enclosed reaction zones, adjustable valve means, back pressure regulating means, pressure regulating means, shut-off valves, inlet means, outlet means, nor volume rate of processing be considered limited.

I claim as my invention:

1. In a process for alternately heating and cooling, by indirect heat transfer, the contents of at least one enclosed reaction zone by the circulation of steam and water as heat transfer mediums in a container encompassing said reaction zones, the improvement which comprises effecting a heating cycle by throttling steam from a substantially constant elevated pressure source through a flow restricting means and then into the upper portion of said container, which is initially filled with water from a previous cooling cycle, and simultaneously maintaining, within said container, a substantially constant elevated back pressure lower than the pressure at said steam source by withdrawing water from the lower portion of said container at a regulated rate, whereby said steam transfers heat to said reaction zones, is thereby condensed, and is subsequently withdrawn as water, and alternating said heating cycle with a cooling cycle effected by introducing cooling water, from a source having substantially the same pressure as the aforesaid steam source, through a flow restricting means and then into the upper portion of said container, said container being maintained at substantially the same back pressure by the same means as in the heating cycle, whereby said cooling water cools the contents of said reaction zones, and condenses the remaining steam in said container thereby filling said container with water.

2. The process of claim 1 further characterized in that the contents of said reaction zones are comprised of material which selectively adsorbs gases.

3. The process of claim 2 further characterized in that said adsorbent material adsorbs the oxides of nitrogen contained in tail gas evolving from the production of nitric acid.

4. In an indirect heat exchanging system comprising at least two units each of which undergoes alternating heating and cooling cycles, and which together at all times during the operation of the system, co-act to effect a heating cycle in at least one unit and a cooling cycle in at least one other unit, the improvement which in each unit comprises at least one enclosed reaction zone encompassed by a container of a heat transfer medium, a source of steam connecting through pressure reducing regulating means and thence through adjustable valve means to the upper portion of said container, a cooling water source connected through pressure reducing regulating means and thence through adjustable valve means to the upper portion of said container, and a back pressure regulating means connected to outlet means from the lower portion of said container through which water is withdrawn from said container, whereby heat transfer fluid is alternately introduced from each of said sources at a substantially constant elevated pressure to said container at a lower elevated back pressure which remains substantially constant by regulation of the rate of withdrawal of water responsive to pressure in said container.

5. The improved apparatus of claim 4 further characterized in that both said source of steam and said source of cooling water are connected through a shut-off valve to the same pressure reducing regulating means and the same adjustable valve means to each container.

References Cited

UNITED STATES PATENTS

| | | | |
|---|---|---|---|
| 2,788,264 | 4/1957 | Bremer et al. | 165—27 |
| 2,915,298 | 12/1959 | Hamlin et al. | 165—27 |
| 3,109,486 | 11/1963 | Hansen | 165—12 |
| 3,155,155 | 11/1964 | Wallstrom et al. | 165—12 |

ROBERT A. O'LEARY, Primary Examiner

CHARLES SUKALI, Assistant Examiner

U.S. Cl. X.R.

165—48, 134